(12) United States Patent
Ota

(10) Patent No.: US 7,530,575 B2
(45) Date of Patent: May 12, 2009

(54) BOOT

(75) Inventor: Katsuhisa Ota, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 131 days.

(21) Appl. No.: 11/516,506

(22) Filed: Sep. 7, 2006

(65) Prior Publication Data

US 2007/0071546 A1 Mar. 29, 2007

(30) Foreign Application Priority Data

Sep. 27, 2005 (JP) ............... 2005-280213

(51) Int. Cl.
*F16J 15/52* (2006.01)
*F16B 21/18* (2006.01)
*B65D 63/06* (2006.01)

(52) U.S. Cl. ............... 277/635; 277/634; 411/517; 24/22

(58) Field of Classification Search ........... 277/553, 277/555, 630, 634–635, 637; 24/20 CW, 24/22, 23 R, 23 W, 30.5; 411/517, 520, 525, 411/526

See application file for complete search history.

(56) References Cited

U.S. PATENT DOCUMENTS 2,273,962 A * 2/1942 Hubbard .................. 277/555
3,576,328 A * 4/1971 Vose ....................... 277/558
3,920,250 A * 11/1975 Eklund .................... 277/555
4,588,195 A * 5/1986 Antonini et al. ............. 277/504
5,649,779 A * 7/1997 Martin et al. ................ 403/51
5,799,953 A * 9/1998 Henderson ................. 277/554
6,536,779 B1 * 3/2003 Maughan et al. ............ 277/635
6,834,863 B2 * 12/2004 Urbach ..................... 277/635

FOREIGN PATENT DOCUMENTS

JP        UM-A-H2-025776        2/1990

* cited by examiner

*Primary Examiner*—Vishal Patel
(74) *Attorney, Agent, or Firm*—Posz Law Group, PLC

(57) ABSTRACT

A fastening member is integrated with a boot body, at least one of a fastening leading end portion or a fastening tail end portion expands or reduces the diameter by elastic deformation, and when the fastening leading end portion or the fastening tail end portion expands the diameter, the fastening member forms the shape of a trumpet. Since the fastening member is integrated with the boot body, a cylindrical small-diameter portion can be readily built in the other part. Since the fastening member forms the shape of the trumpet when the fastening leading end portion or the fastening tail end portion expands the diameter, at least one of the fastening leading end portion and the fastening tail end portion expands or reduces the diameter in the circumferential direction uniformly, and the contact pressure by which the cylindrical small-diameter portion comes into pressure contact with the other part becomes uniform in the circumferential direction, so that the cylindrical small-diameter portion can be stably built in the other part.

6 Claims, 5 Drawing Sheets

BOOT

BACKGROUND OF THE INVENTION

1. Field of the Invention

The present invention relates to a boot which a steering rack boot and a constant velocity joint boot which are used in an automobile are representative of.

2. Related Art

As a boot in which a cylindrical large-diameter portion and a cylindrical small-diameter portion are integrally coupled by a bellows portion, there are, for example, a steering rack boot and a constant velocity joint boot. In these boot, a cylindrical small-diameter portion and a cylindrical large-diameter portion respectively come into contact with the surfaces of the other parts, thereby to define the boot inside and the outside.

In these boot, in order to define the boot inside and the outside surely, the cylindrical small-diameter portion and the cylindrical large-diameter portion must be closely brought into contact with the surfaces of the other parts. Of the other parts, particularly a portion in which the cylindrical small-diameter portion is built (a tie-rod in case of a steering rack boot and a constant velocity joint shaft in case of a constant velocity joint boot) moves generally in the diameter direction and the axial direction. Therefore, in order to prevent the cylindrical small-diameter portion from detaching from the other part, it is necessary to bring the cylindrical small-diameter portion into pressure contact with the surface of the other part. In case that a cylindrical small-diameter portion of a general boot is built in the other part, as shown in FIG. 7, the other part 160 is inserted into a cylindrical small-diameter portion 120, and thereafter the outer portion of the cylindrical small-diameter portion 120 in which the other part has been inserted is fastened by a fastening member 105 such as a hose clip, thereby to bring the cylindrical small-diameter portion 120 into pressure contact with the other part 160. Therefore, the work of building the cylindrical small-diameter portion 120 in the other part 160 requires two steps including an insertion step of inserting the other part 160 into the cylindrical small-diameter portion 120 and a fastening step of fastening the other part 160 and the cylindrical small-diameter portion 120 by the fastening member 105. Therefore, according to the conventional boot, the work of building the cylindrical small-diameter portion 120 in the other part 160 (built-in work) is complicated, so that there is a problem that the cost necessary for the built-in work is high. Further, in order to define surely the inside of the boot 101 from the outside, it is necessary to build the cylindrical small-diameter portion 120 in the predetermined portion of the other part 160. Therefore, in the built-in work, it is necessary to locate the built-in position of the cylindrical small-diameter portion 120 in relation to the other part 160, and locate the built-in position of the fastening member 105 in relation to the cylindrical small-diameter portion 120. This also causes the complicated built-in work and the high cost for the built-in work.

In view of such the circumstances, technology in which a cylindrical small-diameter portion and a fastening member are previously integrated to facilitate the built-in work has been also proposed (refer to, for example, JP-UM-A-2-25776). In a boot disclosed in JP-UM-A-2-25776, as shown in FIG. 8, a fastening member 105 is buried in a cylindrical small-diameter portion 120. Accordingly, when the cylindrical small-diameter portion 120 and the fastening member 105 are built in the other part 160, the cylindrical small-diameter portion 120 comes into pressure contact with the other part 160 by elasticity of the cylindrical small-diameter portion 120 itself and elasticity of the fastening member 105. Therefore, this type boot has an advantage that the above-mentioned fastening step is not required.

The fastening member in the boot disclosed in FIG. 8 is formed, as shown in FIG. 9, in the shape of a split ring (which is nearly cylindrical and the shape in which a part of a peripheral wall 154 is cut along an axis with a full length in the axial direction). Therefore, when the fastening member 105 expands its diameter, a cut portion 152 cleaves. Accordingly, since contact pressure of the cylindrical small-diameter portion 120 with the other part 160 is greatly different according to the position in the circumferential direction of the fastening member 105, the contact pressure of the cylindrical small-diameter portion 120 with the other part 160 is uneven in the circumferential direction. In result, in the conventional boot disclosed in FIGS. 8 and 9, the cylindrical small-diameter portion 120 cannot be stably built in the other part 160.

SUMMARY OF THE INVENTION

The invention, in view of the above circumstances, has been made, and its object is to provide a boot which can build a cylindrical small-diameter portion in the other part readily and stably.

In order to solve the above problem, a boot of the invention is provided with a boot body including a cylindrical large-diameter portion which forms the cylindrical shape, a cylindrical small-diameter portion which is spaced from and arranged coaxially with the cylindrical large-diameter portion, and forms the cylindrical shape having the smaller diameter than the diameter of the cylindrical large-diameter portion, and a bellows portion which forms the shape of a hollow bellows and couples the cylindrical large-diameter portion and the cylindrical small-diameter portion integrally; and a fastening member which forms the cylindrical shape, and is coaxially integrated with the cylindrical small-diameter portion. Herein, the fastening member has a fastening leading end portion located on the opposite side in the axial direction of the cylindrical large-diameter portion, and a fastening tail end portion located on the cylindrical large-diameter portion side;

at least one of the fastening leading end portion and the fastening tail end portion expands or reduces the diameter by elastic deformation; and when the fastening leading end portion or the fastening tail end portion expands the diameter, the fastening member forms the shape of a trumpet.

It is preferable that the boot of the invention has the following constitution (1) or (2). Further, it is desirable that the boot of the invention has both of the constitutions (1) and (2).

(1) At least a part in the axial direction of the fastening member continues throughout the entire periphery in the circumferential direction.

(2) The fastening member is formed integrally with the cylindrical small-diameter portion.

In the boot of the invention, the fastening member is coaxially integrated with the cylindrical small-diameter portion. Therefore, the above-mentioned fastening step can be omitted from the built-in work, and it is not necessary to locate the built-in position of the fastening member in relation to the cylindrical small-diameter portion in the built-in work. Accordingly, according to the boot of the invention, the cylindrical small-diameter portion can be readily built in the other part.

Further, the fastening member has the fastening leading end portion and the fastening tail end portion, of which at least one deforms elastically. When the fastening leading end portion or the fastening tail end portion expands and reduces the diameter, the fastening member forms the shape of a trumpet. Therefore, in the fastening member, at least one of the fastening leading end portion and the fastening tail end portion expands or reduces the diameter in the circumferential direction nearly uniformly. Accordingly, the contact pressure by which the fastening member presses the cylindrical small-diameter portion on the other part, that is, the contact pressure by which the cylindrical small-diameter portion comes into pressure contact with the other part becomes uniform in the circumferential direction. Therefore, according to the boot of the invention, the cylindrical small-diameter portion can be stably built in the other part. Further, in case that the fastening member has the split ring shape, the fastening member expands the diameter throughout the full length in the axial direction nearly uniformly. Therefore, the fastening member having the split ring shape is not formed in the shape of a trumpet when the fastening leading end portion or the fastening tail end portion expands the diameter.

In case that the boot of the invention has the above constitution (1), at least one of the fastening leading end portion or the fastening tail end portion expands or reduces the diameter in the circumferential direction more uniformly. Therefore, in case that the boot of the invention has the above constitution (1), the cylindrical small-diameter portion can be readily built in the other part.

In case that the boot of the invention has the above constitution (2), the step of integrating the fastening member and the cylindrical small-diameter portion can be also omitted in the built-in work. Therefore, in case that the boot of the invention has the above constitution (2), the cylindrical small-diameter portion can be more readily built in the other part.

DETAILED DESCRIPTION OF THE PREFERRED EMBODIMENTS

Figure 1:
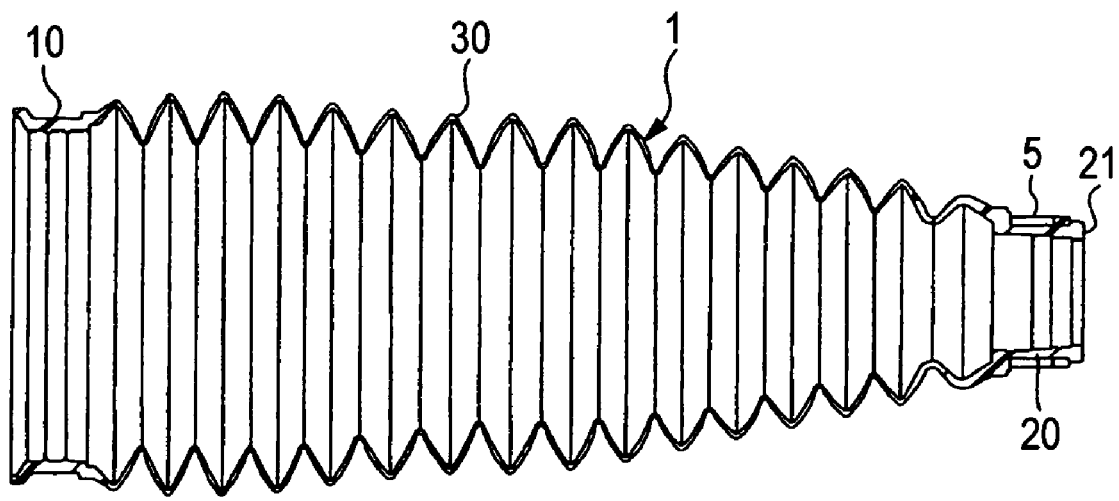
FIG. 1 is a sectional view, showing schematically a boot in a first embodiment.

As material of the fastening member, elastically deformable material such as resin or metal should be selected. The boot body and the fastening member may be formed integrally by a method such as insert molding. Alternatively, the boot body and the fastening member, after being formed separately, may be integrated by bonding. The fastening member may be buried in the cylindrical small-diameter portion, or may appear on the outer surface or the inner surface of the cylindrical small-diameter portion. Considering sealing ability between the cylindrical small-diameter portion and the other part, it is preferable that the fastening member does not appear on the inner surface of the cylindrical small-diameter portion.

The fastening member should be formed so as to form the shape of the trumpet when the fastening leading end portion or the fastening tail end portion expands the diameter. Only the fastening leading end portion or only the fastening tail end portion may deform elastically, or both of them may deform elastically. This is due to the following reason.

Generally, on the leading end portion of the cylindrical small-diameter portion (end portion located on the opposite side in the axial direction to the cylindrical large-diameter portion, hereinafter referred to as a small-diameter leading end portion), an engaging rib which extends in the circumferential direction and projects to the inner side (to the other part side) is formed. In the other part, in the position opposing to the engaging rib, an engaged groove extending in the circumferential direction is formed. The engaging rib engages with the engaged groove, whereby the cylindrical small-diameter portion is positioned in the axial direction in relation to the other part. In the built-in work, when one end of the other part is inserted into the cylindrical small-diameter portion, the engaging rib firstly gets on the other portion than the engaged groove of the other part. Accordingly, the cylindrical small-diameter portion expands the diameter. When the other part is inserted more into the cylindrical small-diameter portion, the engaged groove arrives in the position corresponding to the engaging rib. Then, the engaging rib falls into the engaged groove, and the cylindrical small-diameter portion reduces the diameter. The fastening member is generally arranged closer to the cylindrical large-diameter portion side than to the engaging rib. Therefore, in this case, as long as at least the fastening leading end portion, that is, the engaging rib side portion of the fastening member expands the diameter, the cylindrical small-diameter portion to be pressed in the other part direction by the fastening member also expands the diameter enough. Further, in case that the engaging rib is arranged closer to the cylindrical large-diameter portion side than to the fastening member, the cylindrical large-diameter portion side portion of the fastening member should deform elastically. In any case, as long as the fastening member is formed so as to form the shape of the trumpet when the fastening leading end portion or the fastening tail end portion expands the diameter, at least one of the fastening leading end portion and the fastening tail end portion expands or reduces the diameter in the circumferential direction uniformly. Therefore, the contact pressure by which the cylindrical small-diameter portion comes into pressure contact with the other part becomes uniform in the circumferential direction, so that the cylindrical small-diameter portion can be stably built in the other part. Further, even in case that the engaging rib is not provided for the cylindrical small-diameter portion, as long as at least one of the fastening leading end portion and the fastening tail end portion expands or reduces the diameter in the circumferential direction uniformly, similarly the contact pressure by which the cylindrical small-diameter portion comes into pressure contact with the other part becomes uniform in the circumferential direction, so that the cylindrical small-diameter portion can be stably built in the other part.

[Embodiments]

The boot of the invention will be described below with reference to drawings.

(Embodiment 1)

Figure 2:
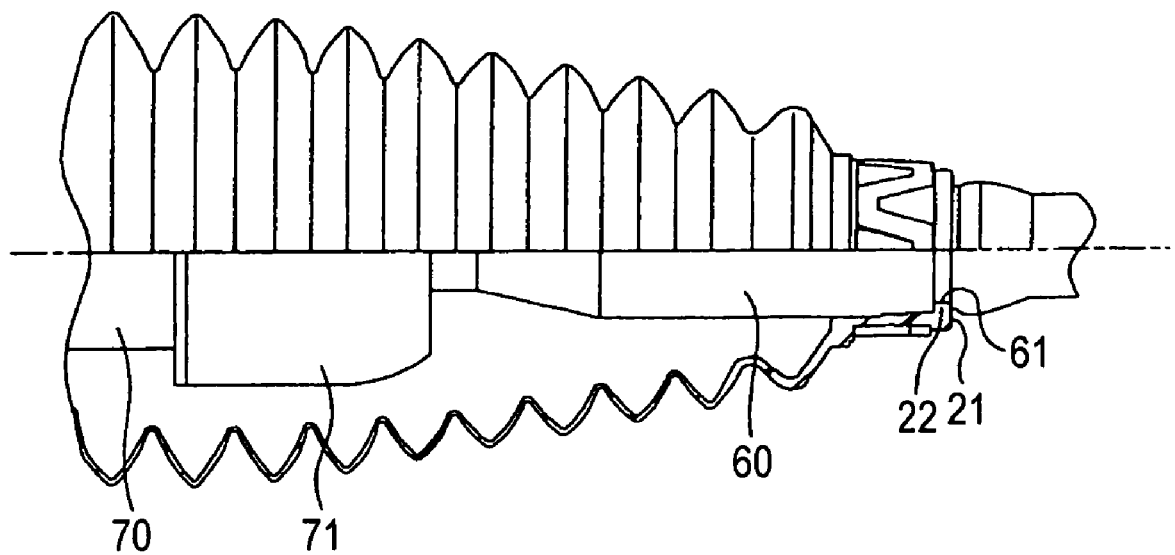
FIG. 2 is a main portion enlarged and broken side view, showing schematically a state where the boot in the first embodiment has been built in the other part.
Figure 3:
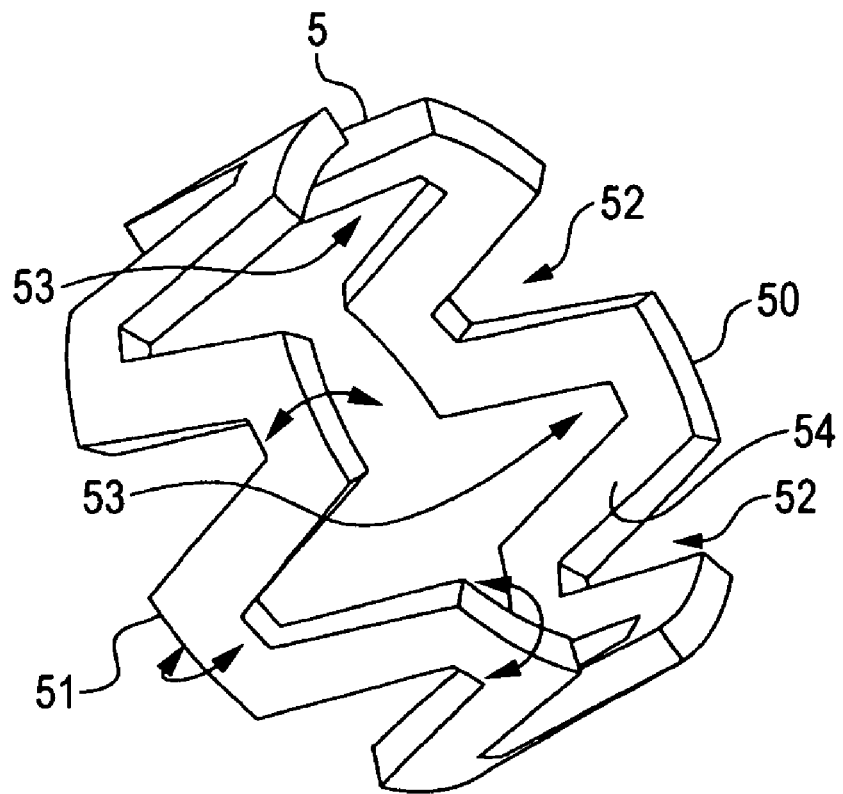
FIG. 3 is a perspective view showing schematically a fastening member in the boot in the first embodiment.
Figure 4:
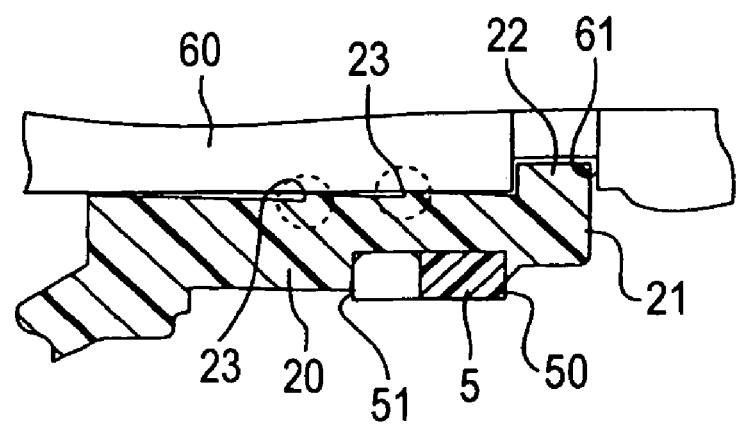
FIG. 4 is a main portion enlarged view of FIG. 2.

A boot in a first embodiment is a steering rack boot, and has the above constitutions (1) and (2). FIG. 1 shows a sectional view of the boot in the first embodiment schematically, and FIG. 2 is a main portion enlarged and broken side view, showing schematically a state where the boot in the first embodiment has been built in the other part. FIG. 3 is a perspective view showing schematically a fastening member in the boot in the first embodiment. FIG. 4 is a main portion enlarged view of FIG. 2.

The boot in the first embodiment is a steering rack boot. A boot body 1 and a fastening member 5 are formed integrally by insert molding. The raw material of the boot body 1 is olefin resin, and the raw material of the fastening member 5 is polypropylene resin. The boot body 1 includes a cylindrical large-diameter portion 10, a cylindrical small-diameter portion 20, and a bellows portion 30. The cylindrical large-diameter portion 10 is built in a steering gear box (not shown). The cylindrical small-diameter portion 20 is built in a tie-rod 60 as shown in FIG. 2. The bellows portion 30 covers a rack bar 70 extending from the steering rack box, the tie-rod 60, and a ball joint 71 which couples the rack bar 70 and the tie-rod 60.

The inner diameter of the cylindrical small-diameter portion 20 is smaller than the outer diameter of the tie-rod 60. On a small-diameter leading end portion 21 of the cylindrical small-diameter portion 20, as shown in FIG. 4, an engaging rib 22 is provided. The engaging rib 22 extends in the circumferential direction and projects to the inner side (to the tie-rod 60 side). In the tie-rod 60, an engaged groove 61 extending in the circumferential direction is formed in the position opposed to the engaging rib 22. The depth of the engaged groove 61 is larger a little than the projection height of the engaging rib 22, the axial length of the engaged groove 61 is larger a little than the axial length of the engaging rib 22. On the inner surface of the cylindrical small-diameter portion 20, two seal ribs 23 which project stepwise in the inner direction are formed. When the cylindrical small-diameter portion 20 is built in the tie-rod 60, the seal ribs 23 come into pressure contact with the peripheral surface of the tie-rod 60, whereby a gap between the cylindrical small-diameter portion 20 and the tie-rod 60 is sealed.

The fastening member 5 is integrated with the cylindrical small-diameter portion 20 in the position closer to the cylindrical large-diameter portion 10 than to the engaging rib 22. The fastening member 5 is buried in the cylindrical small-diameter portion 20. The peripheral surface of the fastening member 5 appears on the peripheral surface of the cylindrical small-diameter portion 20. The fastening member 5 is nearly cylindrical. The fastening member 5 has a fastening leading end portion 50 at one end in the axial direction and a fastening tail end portion 51 at the other end. The fastening leading end portion 50 side and the fastening tail end portion 51 side of the fastening member 5 are notched alternately in the circumferential direction. The notched portions (notches 52, 53) of the fastening member 5 are arranged at a regular interval in the circumferential direction. A peripheral wall 54 of the fastening member 5 continues from the fasting leading end 50 side to the fastening tail end 51 side in the circumferential direction. Therefore, the fastening member 5 of the boot in the first embodiment continues throughout the entire periphery in the circumferential direction while reciprocating in the axial direction.

Since the fastening leading end portion 50 and the fastening tail end portion 51 have the notches 52 and 53, the fastening member 5 deforms elastically and expands or reduces the diameter. Specifically, when the axial leading end of the fastening leading end portion 50 swings outward in the diameter direction, the fastening member 5 expands the diameter. When the axial leading end of the fastening leading end portion 50 swings inward in the diameter direction, the fastening member 5 reduces the diameter. The fastening tail end portion 51 operates similarly. The notches 52 and 53 are alternately formed in the circumferential direction, and the notch 52 of the fastening leading end portion 50 and the notch 53 of the fastening tail end portion 51 are arranged in different phases in the circumferential direction. Therefore, even if the fastening leading end portion 50 expands the diameter, the fastening tail end portion 51 does not expand the diameter, and even if the fastening tail end portion 51 expands the diameter, the fastening leading end portion 50 does not expand the diameter. Further, since the fastening member 5 continues throughout the entire periphery in the circumferential direction, when the fastening leading end portion 50 expands the diameter, the fastening member 5 forms the shape of a trumpet. Further, the fastening member 5 of the boot in the first embodiment, when the fastening tail end portion 51 expands the diameter, forms also the shape of the trumpet.

In the boot in the first embodiment, when the cylindrical small-diameter portion 20 is built in the tie-rod 60, firstly, the cylindrical small-diameter portion 20 is forced in one end of the tie-rod 60. Then, the engaging rib 22 gets on the other portion than the engaged groove 61 of the tie-rod 60, so that great force from the inner side to the outer side is applied onto the cylindrical small-diameter portion 20 and the fastening member 5. Accordingly, the cylindrical small-diameter portion 20 expands the diameter greatly at its engaging rib 22 side portion, that is, at its small-diameter leading end portion 21. The fastening member 5 is arranged closer to the cylindrical large-diameter portion 10 side than to the engaging rib 22. Accordingly, the fastening member 5 expands the diameter greatly at its engaging rib 22 side portion, that is, its fastening leading end portion 50. When the cylindrical small-diameter portion 20 is forced more into the tie-rod 60, the engaged groove 61 arrives in the position corresponding to the engaging rib 22, and the engaging rib 22 falls into the engaged groove 61. Therefore, the engaging rib 22 engages with the engaged groove 61, and the cylindrical small-diameter portion 20 is positioned in relation to the tie-rod 60 in the axial direction. When the engaging rib 22 falls into the engaged groove 61, the cylindrical small-diameter portion 20 and the fastening member 5 attempt to return to their original shapes by their elasticity thereby to reduce the diameter. Since the inner diameter of the cylindrical small-diameter portion 20 is smaller than the outer diameter of the tie-rod 60, the cylindrical small-diameter portion 20 comes into press contact with the tie rod 60 while reducing the diameter. The fastening member 5, also while reducing the diameter, presses the cylindrical small-diameter portion 20 toward the tie-rod 60. Since the fastening member 5 expands the diameter in the shape of a trumpet, and expands or reduces the diameter in the circumferential direction uniformly, the power by which the fastening member 5 presses the cylindrical small-diameter portion 20 toward the tie-rod 60 is also uniform in the circumferential direction. Therefore, the contact pressure by which the cylindrical small-diameter portion 20 comes into pressure contact with the tie-rod 60 becomes uniform in the circumferential direction, and the cylindrical small-diameter portion 20 can be stably built in the tie-rod 60, that is, the other part.

Since the fastening member 5 of the boot in the first embodiment continues throughout the entire periphery in the circumferential direction, it expands or reduces the diameter always uniformly in the circumferential direction. Therefore, according to the boot in the first embodiment, the cylindrical small-diameter portion 20 can be built in the tie-rod 60 very stably.

The fastening member 5 of the boot in the first embodiment is formed integrally with the cylindrical small-diameter portion 20. Accordingly, the built-in work does not require the step of fastening the tie-rod 60 and the cylindrical small-diameter portion 20 by the fastening member 5, the step of locating the built-in position of the fastening member 5 in relation to the cylindrical small-diameter portion 20, and the step of integrating the fastening member S and the cylindrical small-diameter portion 20. Therefore, the boot in the first embodiment can be readily built in the tie-rod 60.

Further, since the polypropylene resin that is harder than the material of the boot body 1 is used as the raw material of the fastening member 5, elastic deformability is given to the fastening member 5 by forming the notches 52 and 53. The notches 52 and 53 of the fastening member 5 may be formed when the fastening member 5 is formed, or may be formed by cutting. In order to diameter-expand or diameter-reduce the fastening member 5 in the circumferential direction uniformly, it is preferable that the notches 52 and 53 are formed respectively in plural positions, and it is preferable that they are formed in the circumferential direction of the fastening member 5 at a regular interval.

(Embodiment 2)

Figure 5:
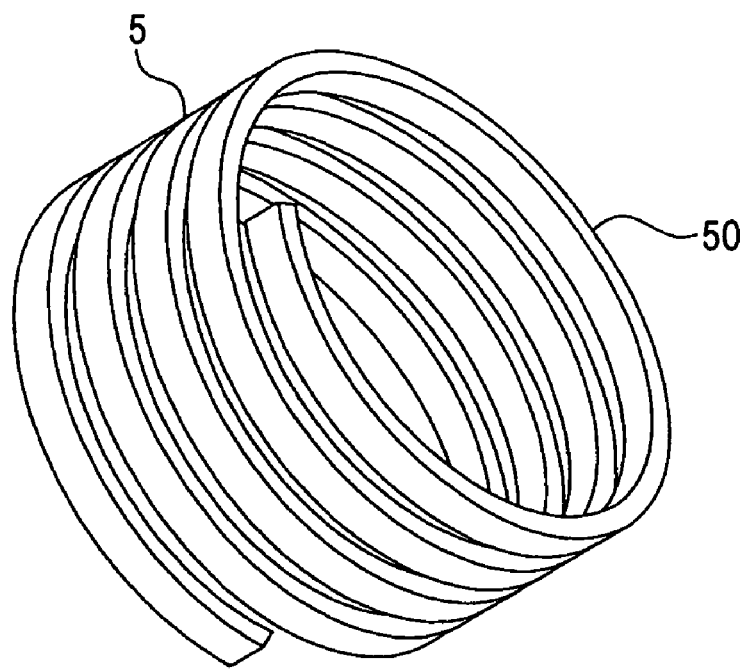
FIG. 5 is a perspective view, showing schematically a fastening member in a boot in a second embodiment.

A boot in a second embodiment is the same as that in the first embodiment except the shape and material of a fastening member. The boot in the second embodiment has the above constitution (2). FIG. 5 is a perspective view, showing schematically a fastening member of the boot in the second embodiment.

As shown in FIG. 5, a fastening member 5 of the boot in the second embodiment 2 is formed in the shape of a coil. The raw material of the fastening member 5 is metal. The fastening member 5 is integrated with a cylindrical small-diameter portion 20 by insert molding. The fastening member 5, at the diameter-reducing time, is wound in about three coils in the circumferential direction of the cylindrical small-diameter portion.

In the boot in the second embodiment, the fastening member 5 is formed in the shape of the coil. Accordingly, the fastening member 5 of the boot in the second embodiment has its tail end portion in the circumferential direction. Namely, the fastening member 5 does not have an endless ring-shaped portion. However, the fastening member 5 of the boot in the second embodiment also forms the shape of a trumpet when a fastening end portion 50 expands the diameter. Therefore, the fastening member 5 expands or reduces the diameter in the circumferential direction uniformly. Accordingly, also in the boot in the second embodiment, the cylindrical small-diameter portion is stably built in a tie-rod.

In the boot in the second embodiment, though the fastening member 5 is formed in the shape of the coil and wound in about three coils in the circumferential direction of the cylindrical small-diameter portion, the winding number of the fastening member 5 may be greater or smaller than three. The coil-shaped fastening member 5, at the diameter-reducing time, must exist continuously in a state where it is longer than the circumferential length of the cylindrical small-diameter portion, and preferably exists continuously, also at the diameter expanding time, in the state where it is longer than the circumferential length of the cylindrical small-diameter portion. Specifically, it is preferable that the fastening member 5 exists continuously in two or more coils in the circumferential direction of the cylindrical small-diameter portion at the diameter-expanding time, and it is preferable that the fastening member 5 exists continuously in three or more coils in the circumferential direction of the cylindrical small-diameter portion at the diameter-reducing time.

(Embodiment 3)

Figure 6:
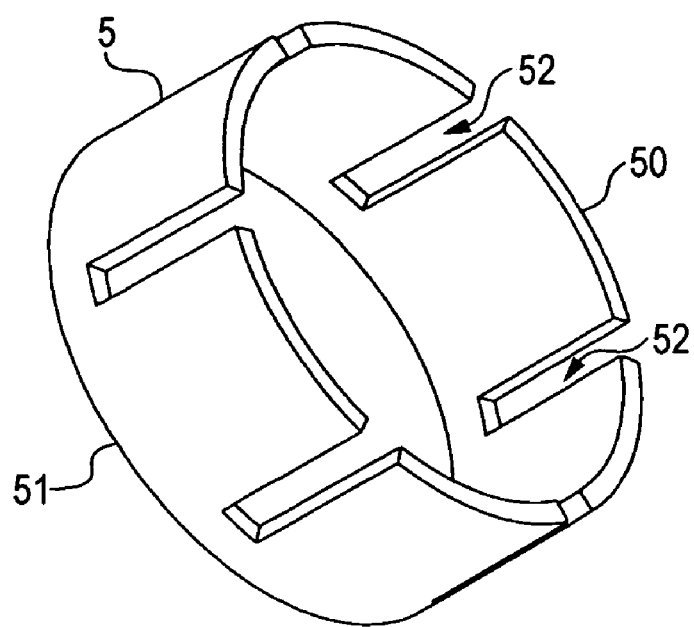
FIG. 6 is a perspective view, showing schematically a fastening member in a boot in a third embodiment.
Figure 7:
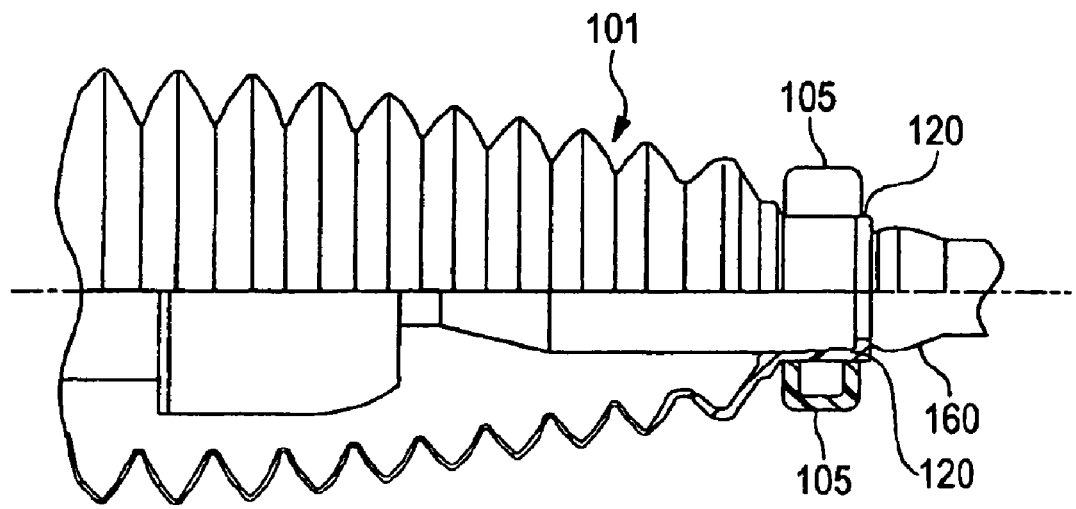
FIG. 7 is a main portion enlarged and broken side view, showing schematically a state where a conventional boot has been built in the other part.
Figure 8:
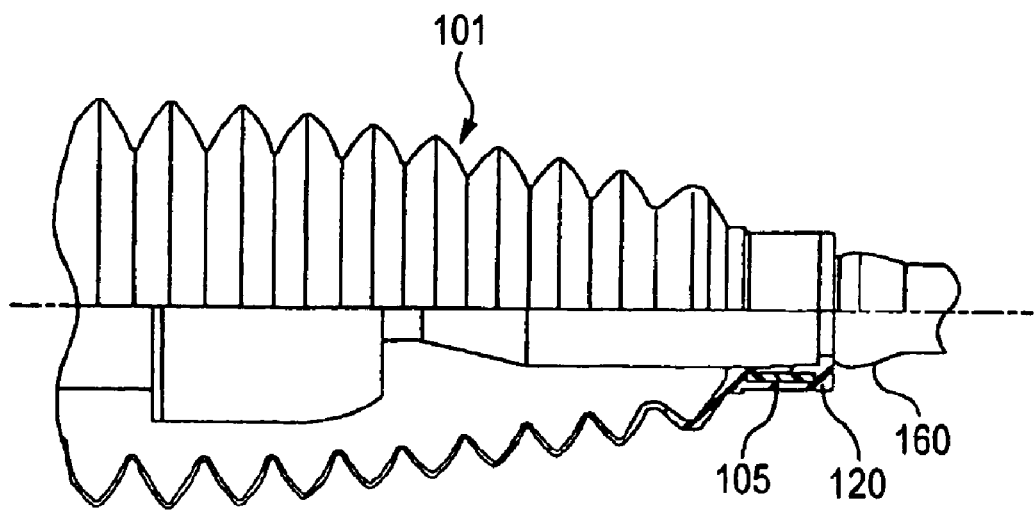
FIG. 8 is a main portion enlarged and broken side view, showing schematically a state where a conventional boot has been built in the other part.
Figure 9:
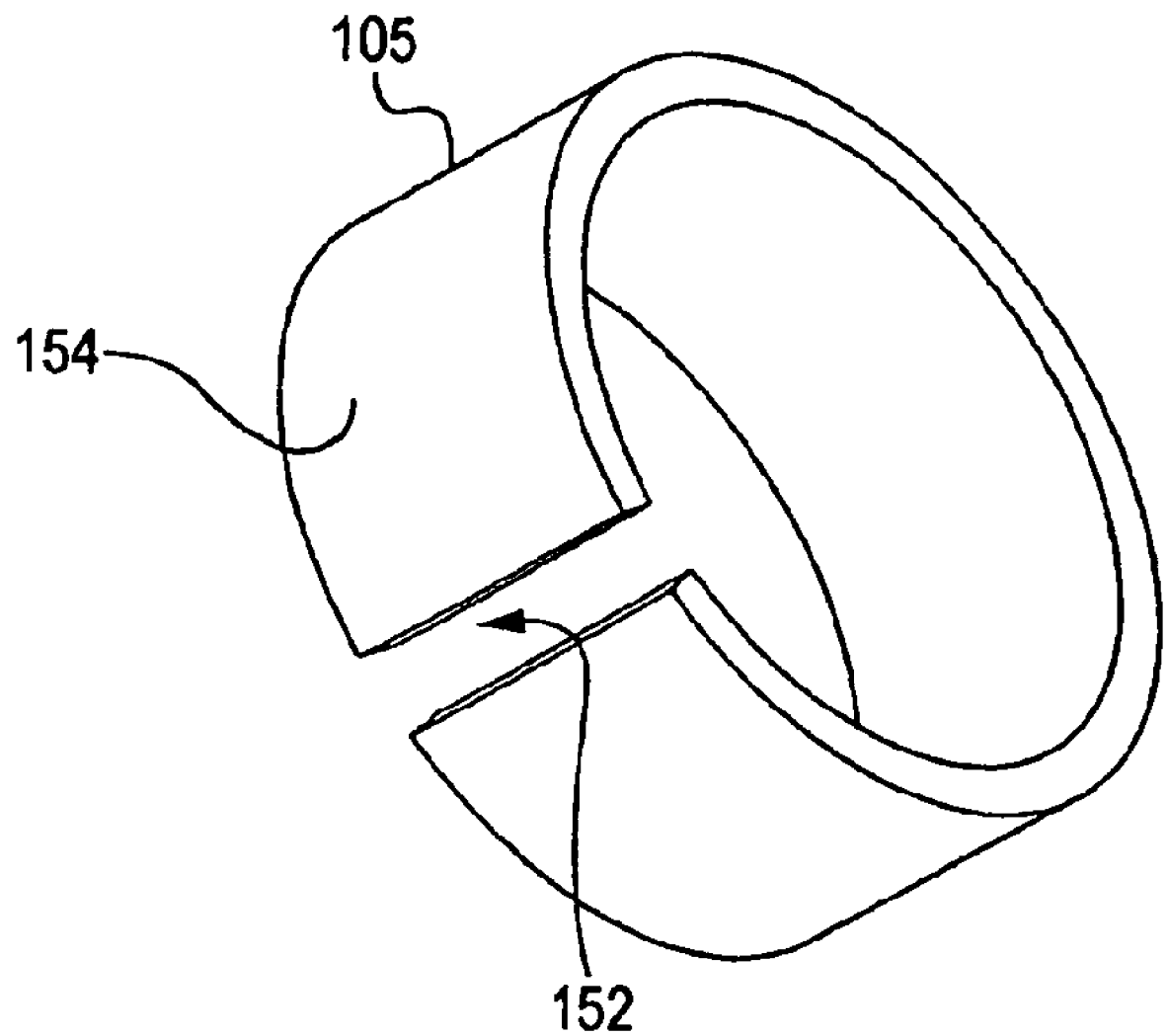
FIG. 9 is a perspective view, showing schematically a fastening member in a conventional boot.

A boot in a third embodiment is the same as that in the first embodiment except the shape of a fastening member. The boot in the third embodiment has the above constitutions (1) and (2). FIG. 6 is a perspective view, showing schematically a fastening member of the boot in the third embodiment.

As shown in FIG. 6, in a fastening member 5 of the boot in the third embodiment, notches 52 are formed in only a fastening leading end portion 50. The notches 52 are formed at a regular interval in the circumferential direction. The fastening member 5 continues on a fastening tail end portion 51 side throughout the entire periphery in the circumferential direction.

The fastening member 5 of the boot in the third embodiment has the notches 52 in the fastening leading end portion 50. When the fastening leading end portion 50 expands the diameter, the fastening member 5 forms the shape of a trumpet. Therefore, the fastening member 5 of the boot in the third embodiment expands or reduces the diameter at the fastening leading end portion SO in the circumferential direction uniformly. Accordingly, also in the boot in the third embodiment, the cylindrical small-diameter portion is stably-built in a tie-rod.

In case that an engaging rib is arranged closer to the cylindrical large-diameter portion side than to the fastening member 5, the notches 52 in the third embodiment should be provided on the fastening tail end portion 51 side.

What is claimed is:

1. A boot comprising:
   a boot body including a cylindrical large-diameter portion, which forms a cylindrical shape, a cylindrical small-diameter portion, which is spaced from and arranged coaxially with the cylindrical large-diameter portion and forms a cylindrical shape having a diameter that is smaller than that of the cylindrical large-diameter portion, and a bellows portion, which forms a shape of a hollow bellows and couples the cylindrical large-diameter portion and the cylindrical small-diameter portion integrally; and
   a fastening member, which is a single wall cylindrical member and is coaxially integrated with the cylindrical small-diameter portion, wherein
   the fastening member has a fastening leading end portion, which is opposite in an axial direction from the cylindrical large-diameter portion, and a fastening tail end portion, which is located on an end of the fastening member that corresponds to the cylindrical large-diameter portion;
   a notch is formed in the fastening leading end portion:
   the fastening tail end portion is continuous around the entire circumference of the fastening member;
   an inner peripheral surface of the fastening tail end portion contacts the cylindrical small-diameter portion;
   the diameter of at least one of the fastening leading end portion and the fastening tail end portion increases or decreases by elastic deformation; and
   when the diameter of the fastening leading end portion or the fastening tail end portion increases, the fastening member forms the shape of a trumpet.

2. The boot according to claim 1, wherein the fastening member and the cylindrical small-diameter portion are integrally formed.

3. The boot according to claim 1, wherein the notch is one of a plurality of notches formed at regular intervals in the circumferential direction.

4. A boot comprising:
a boot body, which has a first end and a second end, wherein
the first end is opposite to the second end,
the boot body includes a first cylindrical section, a second cylindrical section, and a hollow, tapered, bellows portion, which integrally joins the first cylindrical section to the second cylindrical section,
the first cylindrical section, the second cylindrical section and the bellows portion are coaxial,
the first cylindrical section is located at the first end of the boot body and spaced apart axially from the second cylindrical section, which is located at the second end of the boot body, so that the bellows portion is located axially between the first cylindrical section and the second cylindrical section, and
the diameter of the first cylindrical section is greater than that of the second cylindrical section; and
a fastening member, which is generally -a single wall cylindrical member and coaxially surrounds the second section, wherein
the fastening member is adapted to secure the second cylindrical section to a separate structure;
the fastening member has a first end portion and a second end portion, which are opposite to one another,
an inner peripheral surface of the first end portion contacts an outer surface of the second cylindrical section of the boot body;
at least one notch is formed in the second end portion;
the first end portion is continuous in a circumferential direction around the entire fastening member;
at least one of the first end portion and the second end portion expands and contracts by elastic deformation, and
when the diameter of the at least one of the first end portion and the second end portion increases, the fastening member forms the shape of a trumpet.

5. The boot according to claim 4, wherein the fastening member and the second cylindrical section are integrally formed.

6. The boot according to claim 4, wherein the notch is one of a plurality of notches formed at regular intervals in the circumferential direction of the fastening member.

* * * * *